United States Patent
Byrd et al.

(10) Patent No.: US 10,667,636 B1
(45) Date of Patent: Jun. 2, 2020

(54) AIR CONDITIONING LID FOR BEVERAGE CONTAINERS

(71) Applicants: Mark Byrd, Mobile, AL (US); Michael S. Byrd, Naples, FL (US)

(72) Inventors: Mark Byrd, Mobile, AL (US); Michael S. Byrd, Naples, FL (US)

(*) Notice: Subject to any disclaimer, the term of this patent is extended or adjusted under 35 U.S.C. 154(b) by 119 days.

(21) Appl. No.: 15/875,552

(22) Filed: Jan. 19, 2018

(51) Int. Cl.
    *F25D 3/08* (2006.01)
    *A47G 19/22* (2006.01)
    *F24F 5/00* (2006.01)
    *F25D 31/00* (2006.01)

(52) U.S. Cl.
    CPC ..... *A47G 19/2288* (2013.01); *A47G 19/2272* (2013.01); *F24F 5/0017* (2013.01); *F25D 3/08* (2013.01); *F25D 31/002* (2013.01); *F25D 2303/081* (2013.01); *F25D 2331/811* (2013.01)

(58) Field of Classification Search
    CPC .. A47G 19/2288; A47G 19/2272; F25D 3/08; F25D 17/06; F25D 17/062; F25D 31/002; F25D 2303/081; F25D 2331/811; F25D 17/04; A23N 12/08; B60N 3/104; B60N 3/106; F24F 5/0017; F24F 13/00; A47J 31/00; A47J 31/005
See application file for complete search history.

(56) References Cited

U.S. PATENT DOCUMENTS

| | | | | |
|---|---|---|---|---|
| 1,922,790 A | * | 8/1933 | Alger | F24F 5/0017 62/425 |
| 3,961,496 A | * | 6/1976 | Ku | B60H 1/00 62/459 |
| 5,062,281 A | * | 11/1991 | Oliphant | F24F 5/0017 62/406 |
| 5,159,819 A | | 11/1992 | Wong | |

(Continued)

FOREIGN PATENT DOCUMENTS

WO    2018049194 A1    3/2018

OTHER PUBLICATIONS amazon.com, "Baby Stroller Cooling System Upgrade Kit", available at https://www.amazon.com/Baby-Stroller-Cooling-System-Upgrade/dp/B0041BCF9I (last visited Aug. 2, 2018).

(Continued)

*Primary Examiner* — Emmanuel E Duke
(74) *Attorney, Agent, or Firm* — AdamsIP, LLC; J. Hunter Adams

(57) ABSTRACT

An air conditioning lid for use with beverage containers is provided. The lid is designed to cover the open end of a beverage container and to direct ambient air over or through the contents of the beverage container to generate conditioned air. The lid includes a body and a fan. The body is defined by a container engagement portion that engages with the open end of the beverage container and a duct portion that extends downwardly from the container engagement portion. The duct portion defines a first air channel through (Continued)

which ambient air drawn through an intake opening within the container engagement portion by the fan may be directed towards the contents of a beverage container. Conditioned air resulting from an exchange of heat between the ambient air and contents of the beverage container is directed to users via a second air channel within the container engagement portion.

18 Claims, 4 Drawing Sheets

(56) References Cited

U.S. PATENT DOCUMENTS

| | | | |
|---|---|---|---|
| 5,857,350 | A | 1/1999 | Johnson et al. |
| 5,953,933 | A | 9/1999 | Cheng |
| 6,227,004 | B1* | 5/2001 | Gerstein ............ A47G 19/2288 62/421 |
| 6,886,360 | B1* | 5/2005 | Rosenbaum .............. F24F 1/04 62/406 |
| 7,188,489 | B2* | 3/2007 | Martello ................ B60H 1/005 62/420 |
| 2003/0230109 | A1* | 12/2003 | Link .................. B60H 1/00264 62/420 |
| 2005/0150251 | A1 | 7/2005 | Navedo et al. |
| 2006/0254306 | A1 | 11/2006 | Urfig |
| 2009/0044932 | A1* | 2/2009 | Blackstone ........ A41D 13/0025 165/158 |
| 2018/0073769 | A1* | 3/2018 | Herweck ............... F24F 5/0017 |

OTHER PUBLICATIONS amazon.com, "Thermos 24 Ounce Hydration Bottle with Connected Smart Lid, Smoke", available at https://www.amazon.com/Thermos-Ounce-Hydration-Bottle-Connected/dp/B00ZQUNI6W (last visited Aug. 2, 2018).

Handy Cooler, An air conditioning system for baby strollers—Handy CoolerTM baby stroller upgrade kit, available at http://www.myhandycooler.com/products_babystroller.html (last visited Aug. 2, 2018).

Homedics, "Personal Space Cooler 2.0", available at https://www.homedics.com/mychill.html (last visited Aug. 2, 2018).

Kolmon, "LED Bluetooth Speaker Fan", available at http://www.kolmon.net/led-bluetooth-speaker-fan-p00152p1.html (last visited Aug. 2, 2018).

kharidlay.com, "No Leaf Air Condition Bladeless Fan & Room Freshener", available at http://www.kharidlay.com/Unique-Prod/No-leaf-Air-Condition-Bladeless-Fan---Room-Freshener-id-266080.html (last visited Aug. 2, 2018).

ebay.com, "Mini POrtable Outdoor Foldable Handheld Cooling Fan + Rechargeable 18650 Battery", available at https://www.ebay.com/itm/Mini-Portable-Outdoor-Foldable-Handheld-Cooling-Fan-Rechargeable-18650-Battery-/372301202513 (last visited Aug. 2, 2018).

alibaba.com, "Portable 2 in 1 USB Mini Humidifier Air Cooling Mister Fan", available at http://www.tyloc-tech.com/product/60422106008-803134035/Portable_2_in_1_USB_Mini_Humidifier_Air_Cooling_Mister_Fan.html (last visited Aug. 2, 2018).

amazon.com, "Unifire Mini Portable USB Rechargeable Hand Held Air Conditioner Summer Cooler Fan (green)", available at https://www.amazon.com/Unifire®-Portable-Rechargeable-Air-Conditioner/product-reviews/B00W9AYL90 (last visited Aug. 2, 2018).

amazon.com, "Cool on the Go! Personal Clip on Fan with LED Lights—Versatile Hands-Free Personal Cooling Device—USB Fan/Stroller Fan/Table Fan/Travel Fan/Wearable Fan/Tent Fan/Fan & More . . . Blue/White", available at https://www.amazon.com/dp/B007OWTTAO//ref=cm_sw_su_dp?tag=relprods-20 (last visited Aug. 2, 2018).

amazon.com, "The Original Handy Cooler Small Fan & Mini-Air Conditioner, Pink", available at https://www.amazon.com/Original-Handy-Cooler-Mini-Air-Conditioner/dp/B003KCT4UC (last visited Aug. 2, 2018).

Ireviews, "Zero Breeze—Review", available at https://www.ireviews.com/review/zero-breeze (last visited Aug. 2, 2018).

Indiegogo, "World's First Personal Air Conditioner", available at https://www.indiegogo.com/projects/world-s-first-personal-air-conditioner#/ (last visited Aug. 2, 2018).

Airwirl, "Life-Style Innovations", available at https://www.airwirl.com/ (last visited Aug. 21, 2018).

* cited by examiner

AIR CONDITIONING LID FOR BEVERAGE CONTAINERS

FIELD OF THE DISCLOSURE

The subject matter of the present disclosure generally relates to an air conditioning lid for use with beverage containers.

BACKGROUND

Individuals commonly engage in activities and attend events in outdoor environments. Depending on the weather conditions present in the outdoor environment during an individual's participation in such activities or attendance of such events, the individual may be subjected to intense heat or extreme cold, thus causing the individual to experience discomfort. To provide temporary relief from such discomfort, individuals commonly ingest beverages having a temperature above or below the temperature of the outdoor environment. For instance, to combat the effects of intense heat, individuals may carry or purchase beverage containers containing cooled or iced liquids having a temperature below that of the outdoor environment. Conversely, to combat cold weather conditions, individuals may carry beverage containers containing heated liquids having a temperature above that exhibited by the outdoor environment. Although, ingesting cooled or heated liquids can provide temporary relief from discomforting weather conditions, continued application of cooled or heated air to an individual's may serve to provide more prolonged and effective relief. To this end, attempts have been made in the art to create air conditioning devices designed to utilize the internal contents of a beverage container to cool or warm individuals. However, known devices of this kind are largely impractical or ineffective as they generally either require the use of a specially designed container or lack any means to direct ambient air over or through the internal contents of a beverage container to generate conditioned air sufficient to cool or warm an individual's skin.

Accordingly, there is a need in the art for an air conditioning device that can be utilized with known beverage containers and that effectively provides conditioned air to individuals by utilizing the heated or cooled contents of the beverage container.

SUMMARY

An air conditioning lid for use with beverage containers is provided. The lid of the present disclosure is designed for use with beverage containers having an open end and is configured to direct ambient air over or through the contents of the beverage container to generate and subsequently deliver conditioned air to users. The lid generally comprises a body and a fan. The body may be defined by a container engagement portion and a duct portion. The container engagement portion is configured to engage with and cover the open end of a beverage container. The duct portion extends downwardly from the container engagement portion to define a first air channel through which ambient air may be directed towards the contents of the beverage container on which the lid is installed. To permit passage of ambient air into the first air channel, the container engagement portion has at least one intake opening positioned above the first air channel. Conditioned air may be generated by passing ambient air over or through the contents of the beverage container. Conditioned air is directed out of the beverage container and lid to users by way of a second air channel within the container engagement portion. The second air channel may have an inlet that encompasses the first air channel and an outlet disposed within a side wall of the container engagement portion. In some instances, the container engagement portion may have a spout extending outwardly from the outlet to further direct conditioned air exiting the lid.

The fan is configured to draw ambient air through the body of the lid and generally comprises a motor adapted to electrically connect to a power supply and a fan blade operably connected to the motor. As electrical power from a power supply is applied to the motor, the motor provides rotational motion to the fan blade. The fan is preferably secured to the body of the lid such that rotation of the fan blade draws ambient air through the intake opening into the first air channel. To facilitate portable use of the lid, the motor may be adapted to electrically connect to a computing device, such as a cellular phone, tablet, or laptop computer, and draw electrical power therefrom. In other embodiments, the lid may further comprise a power supply operably connected to the motor. In such embodiments, the lid may further comprise a solar panel secured to the container engagement portion and electrically connected to the power supply to charge the same.

To use the lid, the body is first engaged with the open end of a beverage container containing cool or heated substances such that the container engagement portion of the body covers the open end of the beverage container and the duct portion is suspended within the interior volume of the beverage container. In some embodiments, the container engagement portion may have a first set of threading which may be interlocked with a second set of threading disposed on an interior surface of the beverage container to engage the two. Electrical power from a power supply is applied to the motor causing the fan blade to rotate and draw ambient air from the environment surrounding the lid and beverage container through the intake opening of the container engagement portion into the first air channel and over or through the cool or heated contents of the beverage container to generate conditioned air. The wall of the beverage container and incoming ambient airflow caused by rotation of the fan blade directs conditioned air through the second air channel for delivery to a user.

The foregoing summary has outlined some features of the device of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the device and methods disclosed herein. Those skilled in the pertinent art should also realize that such equivalent designs or modifications do not depart from the scope of the device and the methods of the present disclosure.

DESCRIPTION OF DRAWINGS

These and other features, aspects, and advantages of the present disclosure will become better understood with regard to the following description, appended claims, and accompanying drawings where:

DETAILED DESCRIPTION

Figure 1:
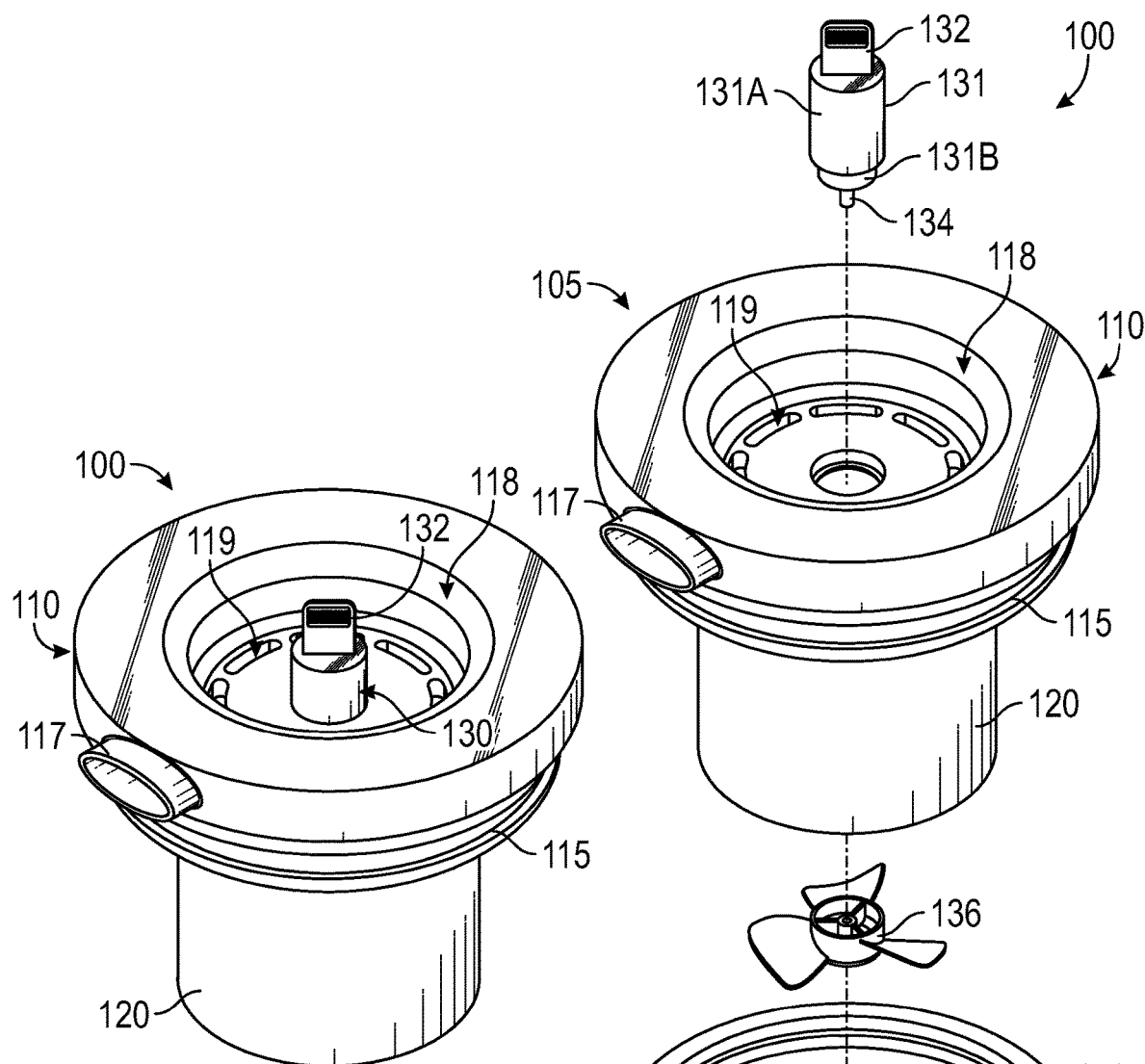
FIG. 1 is a front perspective view of a lid embodying features consistent with the principles of the present disclosure.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. The term "removably secured" and grammatical equivalents thereof are used herein to mean the joining of two components in a manner such that the two components are secured together, but may be detached from one another and re-secured together without requiring the use of specialized tools.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Turning now to the drawings, FIGS. 1-9 illustrate preferred embodiments of an air conditioning lid, or certain components thereof, for use with beverage containers. The lid 100 of the present disclosure is generally designed to provide a device that can be utilized in conjunction with known beverage containers, and the contents contained therein, to convert ambient (unconditioned) air 300A into conditioned air 300B for delivery to users. The lid 100 has a body 105 defined by a container engagement portion 110 and a duct portion 120. The container engagement portion 110 is generally designed to engage with and cover the open end 205 of a beverage container 200. To this end, the container engagement portion 110 has an upper section 112 sized and shaped to cover the open end 205 of the beverage container 200 and a lower section 114 that engages with and/or is disposed adjacent to an interior wall surface of the beverage container 200 when the lid 100 is installed on the beverage container 200. The upper section 112 of the container engagement portion 110 has at least one intake opening 119 therein that allows ambient air to pass through the body of the lid 100.

The duct portion 120 extends downwardly from the container engagement portion 110 and defines a first air channel 140 that directs ambient air 300A passing through the at least one intake opening 119 towards the contents 250 of the beverage container 200. The lid 100 further comprises a fan 130 secured to the body 105 that draws ambient air 300A through the at least one intake opening 119 into the first air channel 140 when operational. The fan comprises a motor 130 configured to electrically connect to a power supply 138 and to rotate a fan blade 136 operably connected to the motor 130. Rotation of the fan blade 136 preferably draws ambient air 300A through the at least one intake opening 119 and the first air channel 140 towards the contents 250 of the beverage container 200.

As the ambient air 300A passes over or through the contents 250 of the beverage container 200, heat is exchanged between the contents of the ambient air and the contents of the beverage container 200, thereby conditioning the ambient air. For instance, if the temperature of the ambient air is greater than the temperature of the contents 250 of the beverage container 200, heat from the ambient air 300A is transferred to the contents 250 of the beverage container 200, thereby cooling the ambient air 300A to produce conditioned air 300B. Conditioned air 300B is directed out of the of the beverage container 200 and lid 100 for delivery to users via a second air channel 150 within the container engagement portion 110 of the body 105. In this way, the lid 100 of the present disclosure provides an air conditioning device that can be utilized with known beverage containers 200 to provide conditioned air 300B to users.

Figure 2:
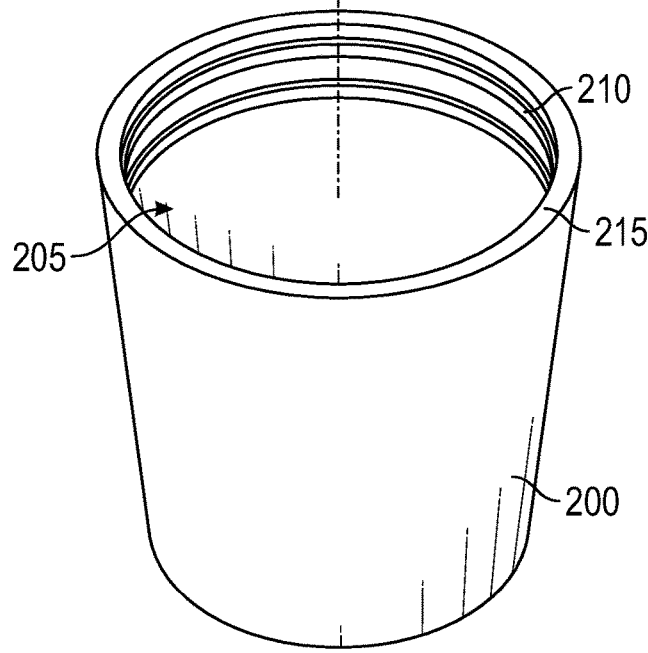
FIG. 2 is an exploded view of a lid embodying features consistent with the principles of the present disclosure.

As shown in FIGS. 1-5 and 7-9, the lid 100 generally comprises a body 105 and a fan 130. The body 105 is defined by a container engagement portion 110 and a duct portion 120, as shown in FIGS. 1-2. The body 105 is preferably a unitary body such that the container engagement portion 110 and the duct portion 120 form a single component. Alternatively, the container engagement portion 110 and duct portion 120 may be two separate components secured together. The body 105 may comprise any material including but not limited to, plastic, wood, metal, or combinations thereof. In a preferred embodiment, the body 105 may comprise a food grade plastic, such as high density polyethylene (HDPE) plastic.

The container engagement portion 110 is shaped and sized to engage with and cover the open end 205 of a beverage container 200. As shown best in FIG. 4, the container engagement portion 110 is defined by an upper section 112 and a lower section 114. To cover and prevent the body 105 from falling into a beverage container 200, the upper section 112 of the container engagement portion 110 is sized and shaped to have a diameter equal to or greater than the diameter of the open end 205 of the beverage container 200. Thus, depending on the dimensions of the beverage container 200, the size and shape of the upper section 112 of the container engagement portion 110 may vary. To correspond to beverage containers 200 having a rounded open end 205, the upper section 112 of the container engagement portion 110 may be annularly shaped. However, one of skill in the art will appreciate that the upper section 112 may retain alternative shapes, such as square-shaped, rectangular-shaped, or triangular-shaped, without departing from the inventive subject matter disclosed herein.

Figure 4:
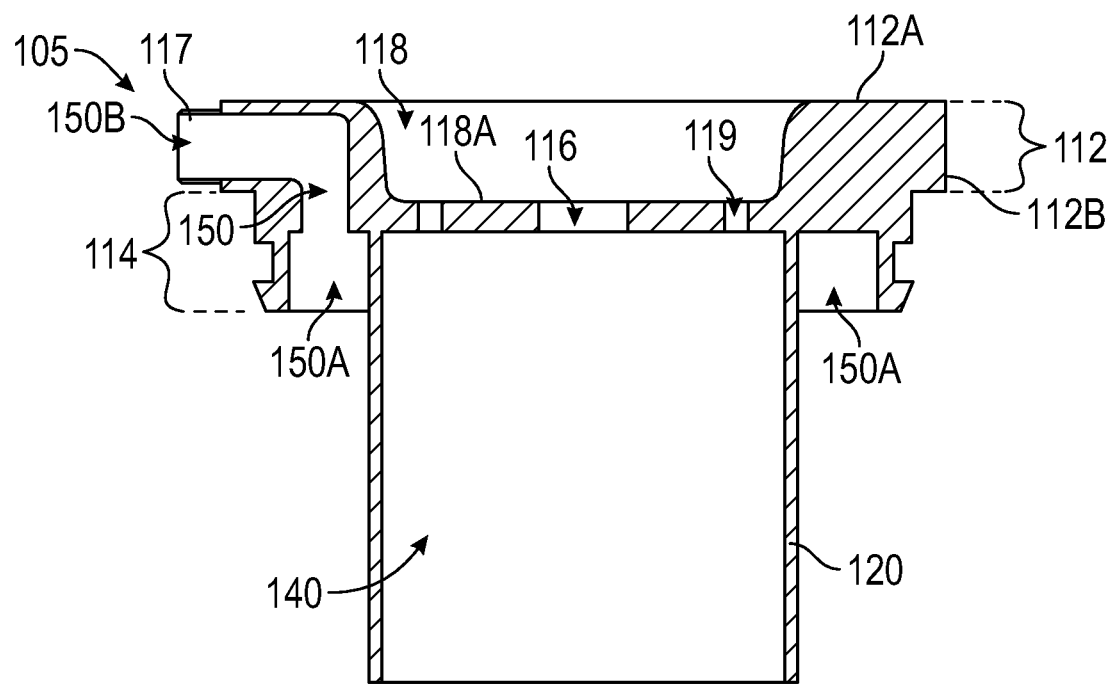
FIG. 4 is a cross-sectional view along line 4-4 shown in FIG. 3 of a lid embodying features consistent with the principles of the present disclosure.
Figure 5:
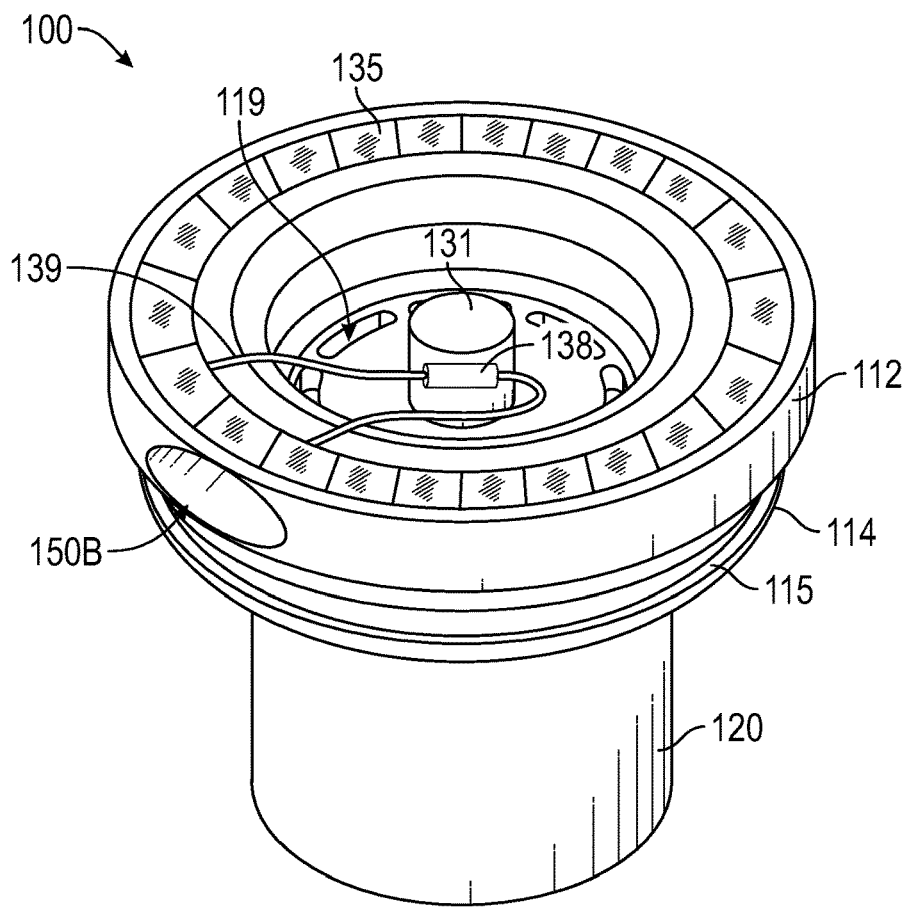
FIG. 5 is a front perspective view of a lid embodying features consistent with the principles of the present disclosure.
Figure 8:
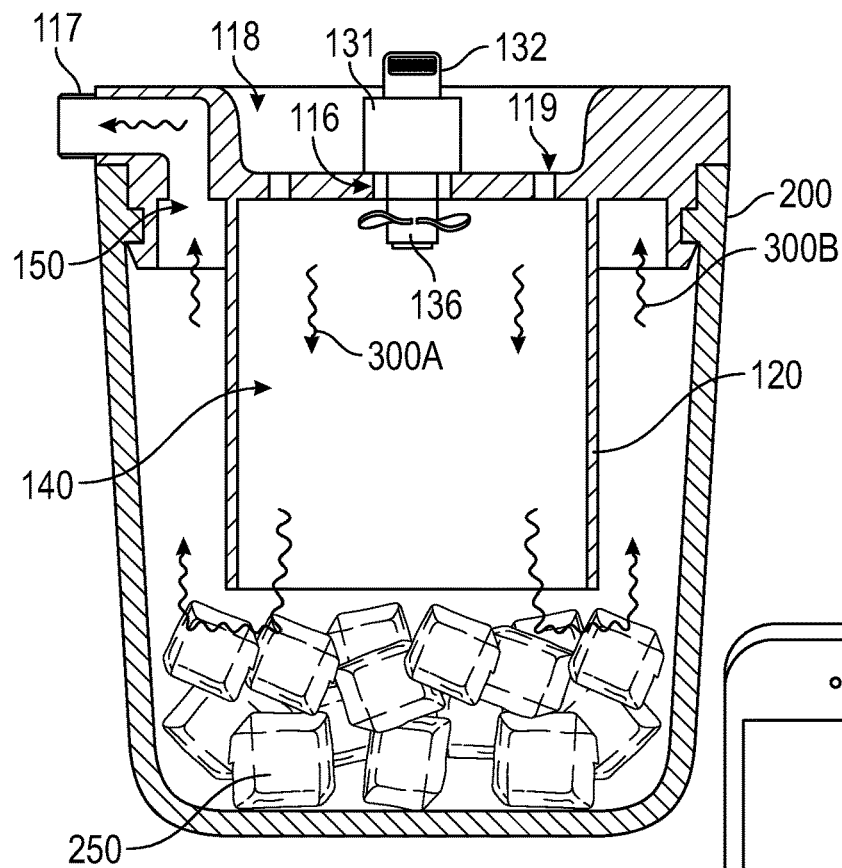
FIG. 8 is a cross-sectional view of a lid embodying features consistent with the principles of the present disclosure installed on a beverage container containing ice.
Figure 9:
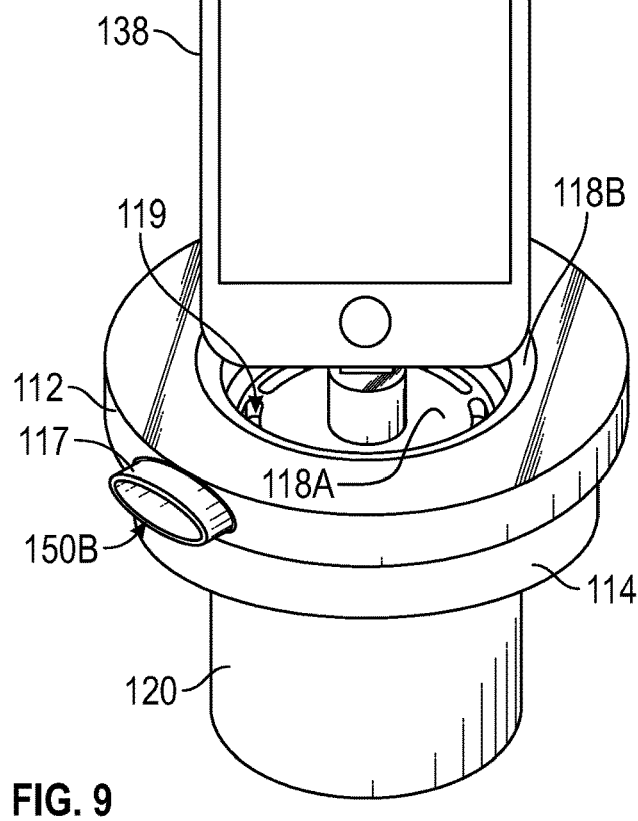
FIG. 9 is a front perspective view of a lid embodying features consistent with the principles of the present disclosure electrically connected to a power supply.

As shown in FIG. 4, the exterior of the upper section 112 of the container engagement portion 110 may be generally defined by a top face 112A and a side wall 112B. In some embodiments, the top face 112A and the side wall 112B may perpendicularly intersect. In a preferred embodiment, the top face 112A may have a cavity 118 formed therein in which certain components of the fan 130 or a power supply 138 may be disposed. The cavity 118 is generally defined by a floor 118A and a side wall 118B extending upwardly therefrom. As shown in FIGS. 1-2, 4-5, and 8-9, the cavity 118 may be centrally disposed within the top face 112A. The diameter of the cavity 118 may be approximately equal to the diameter of the duct portion 120 described herein, as best shown in FIGS. 4 and 8. In some instances, the cavity 118 may be configured to accommodate a hand-held computing device, e.g., a smart phone, such that the computing device may be at least partially inserted into the cavity 118 in an upright position, as shown in FIG. 9. In one such embodiment, the side wall 118B of the cavity 118 may be at least partially slanted such that a hand-held computing device may rest on the side wall 118B above the floor 118A of the cavity 118 when electrically connected to a connector 132 of the motor 131, as best shown in FIG. 9. The cavity 118 may be annularly shaped, as best shown in FIGS. 1-2 and 5, though the cavity 118 may retain an alternative shape and still fall within the scope of the present disclosure. When the lid 100 is installed on a beverage container 200, the upper section 112 of the container engagement portion 110 rests on and/or is disposed above the rim 215 of the beverage container 200 such that the top face 112A and the side wall 112B are exposed to the external environment surrounding the lid 100 and beverage container 200, as best shown in FIGS. 4 and 8.

Figure 3:
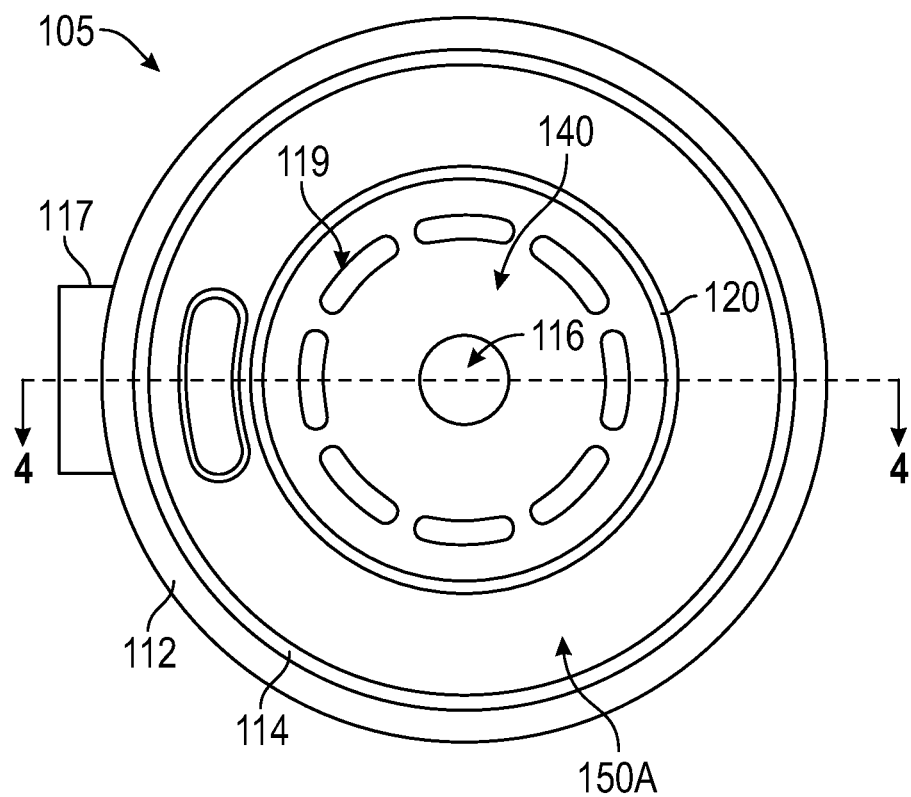
FIG. 3 is a bottom view of a lid embodying features consistent with the principles of the present disclosure.

The lower section 114 of the container engagement portion 110 is sized and shaped for insertion within the open end 205 of a beverage container 200. Accordingly, the diameter of the lower section 114 of the container engagement portion 110 is smaller than the diameter of both the open end 205 of the beverage container 200 and the upper section 112 of the container engagement portion 110. When the lid 100 is installed on a beverage container 200, the lower section 114 of the container engagement portion 110 engages with and/or is disposed adjacent to an interior wall surface of the beverage container 200, as shown best in FIG. 8. To correspond to the contours of rounded beverage containers 200, the lower section 114 may be annularly shaped, though one of skill in the art will appreciate the lower section may retain alternative shapes and still fall within the scope of the present disclosure. As shown in FIGS. 3-4 and 8, the lower section 114 of the container engagement portion 110 may have a substantially hollow bottom such that the bottom of the lower section 114 and the exterior surface of the duct portion 120 define an inlet 150A that encompasses the first air channel 140 disclosed herein.

To install the lid 100 on a beverage container 200, the lower section 114 of the container engagement portion 120 preferably has a first set of threading 115 on its exterior surface that is configured to interlock with a second set of threading 210 disposed on an interior surface of the beverage container 200, as shown best in FIG. 2. In such embodiments, the lid 100 may be installed to a beverage container 200 by aligning the first set of threading 115 with the second set of threading 205 and rotating the body 105 in a first direction, e.g., clockwise, until the first set of threading 115 and the second set of threading 210 are fully interlocked, thereby removably securing the lid 100 to the beverage container 200. To remove the lid 100 from the beverage container 200, the body 105 may be rotated in a second direction that is opposite the first direction, e.g., counter-clockwise, until the first set of threading 115 and the second set of threading 210 are fully disengaged. Once the first and second set of threading are disengaged, a user may subsequently lift the body 105 away from the open end 205 to disassociate the lid 100 from the beverage container 200. As shown in FIG. 9, the lower section 114 of the container engagement portion 110 may alternatively be devoid of such threading such that when installed the lid 100 may be installed on a beverage container 200 by inserting the lower section 114 into the open end 205 of the beverage container 200 and allowing the upper section 112 to rest on top of the rim 215 of the beverage container 200. In such embodiments, a gasket (not shown) may be secured around the exterior surface of the lower section 114 such that an airtight seal is established between the lower section 114 and the body of the beverage container 200 when the lid is installed 100 on the beverage container 200.

The duct portion 120 of the body 105 extends downwardly from the container engagement portion 110 and is configured to direct ambient air 300A toward the contents 250 of the beverage container 200, as shown in FIG. 8. The duct portion 120 is substantially hollow from its first end (proximal to the container engagement portion 120) to its second end (opposite the first end) to provide a first air channel 140 through which ambient air 300A may pass, as best shown in FIGS. 4 and 8. To direct ambient air 300A towards and subsequently over or through the contents 250 of the beverage container 200 to which the lid 100 is installed, the duct portion 120 is preferably elongated. As best shown in FIG. 3, the diameter of the cut portion 120 is smaller than the diameter of the lower section 114 of the container engagement portion 110. The length of the duct portion 120 may vary to accommodate beverage containers 200 of various sizes. As shown in FIGS. 1-4 and 8, the duct portion 120 may be cylindrically shaped, though the duct portion 120 may be shaped in alternative fashions without departing from the inventive subject matter disclosed herein.

Passage of ambient air 300A from and outside environment through the container engagement portion 110 and into the first air channel 140 is facilitated by at least one intake opening 119 within the container engagement portion 110 of the body 105. To provide for increased ambient air 300A inflow, the container engagement portion 110 preferably has a plurality of intake openings 119 therein. Each intake opening 119 within the container engagement portion 110 is disposed directly above the first air channel 140 such that air passing through the intake openings 119 subsequently enters the first air channel 140. To support the fan 130, the container engagement portion 110 may also have a docking port 116 therein disposed above the first air channel 140, as shown in FIGS. 3-4 and 8. The docking port 116 preferably has a diameter of sufficient size such that the motor 131 of the fan 130 may be at least partially inserted through the docking port 116. In a preferred embodiment, the intake openings 119 and the docking port 116 are disposed within the cavity 118 such that the docking port 116 and intake openings 119 extend through the floor 118A of the cavity 118 to the first air channel 140. As shown best in FIG. 3, in one preferred embodiment, the docking port 116 may be centrally disposed within the floor 118A of the cavity 118 and the at least one intake opening 119 may be annularly positioned around the docking port 116.

Figure 6:
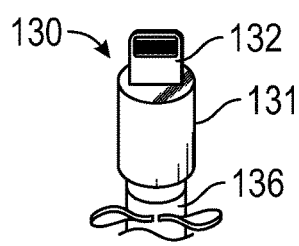
FIG. 6 is a front view of a fan embodying features consistent with the principles of the present disclosure.

The fan 130 may be used to draw ambient air 300A through the body 110 of the lid 100 and direct the same downwardly through the first air channel 140, as shown best in FIG. 8. As shown in FIG. 6, the fan 130 generally comprises a motor 131 and a fan blade 136 operably connected thereto. The motor 131 is adapted to electrically connect to a power supply 138 and draw electrical power therefrom to rotate the fan blade 136. To this end, the motor 131 may have an electrical connector 132 and an axle 134 extending outwardly therefrom. In one preferred embodiment, the electrical connector 132 may extend outwardly from a first end of the motor 131 and the axle 134 may extend outwardly from a second end of the motor 131, as shown best in FIG. 2. However, one of skill in the art will readily appreciate the connector 132 and axle 134 may be positioned elsewhere without departing from the inventive subject matter disclosed herein.

Figure 7:
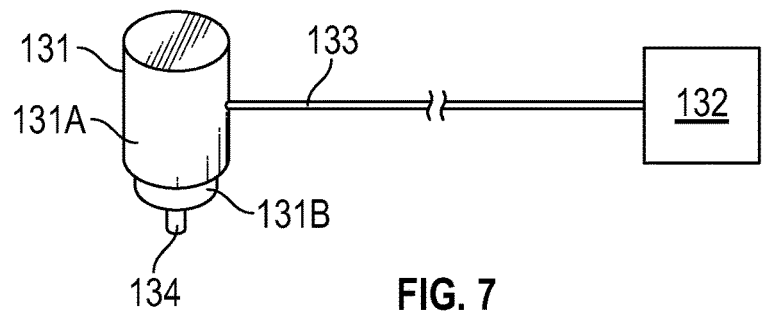
FIG. 7 is a front view of a motor embodying features consistent with the principles of the present disclosure.

The electrical connector 132 may be any device suitable for electrically connecting the motor 131 to a power supply 138. Accordingly, the electrical connector 132 may take a variety of forms and thus is generally represented in FIG. 7 to reflect the same. In one preferred embodiment, the electrical connector 132 is configured to electrically connect the motor 131 to a computing device, such as a smartphone, and draw power therefrom, as shown best in FIG. 9. In one such embodiment, the electrical connector 132 may be a lightning (8 pin) connector as shown in FIGS. 1-2, 6, and 8, though other electrical connectors, such as USB Type A, USB Type B, USB Type C, USB Mini A, USB Mini B, USB Micro A, USB Micro B connectors, or any other similar electrical connectors may be used to accommodate various computing devices. Alternatively, the electrical connector 132 may be configured to electrically connect to a battery or electrical wall socket. Accordingly, in some embodiments, the electrical connector 132 may comprise a battery holder or an electrical plug. As shown in FIG. 7, in one embodiment, the electrical connector 132 may be connected to the body of the motor 131 via an electrical cable 133, thereby enabling users to use the lid 100 without having to be in close proximity to a power supply 138. The length of the electrical cable 133 may be vary or be adjusted to accommodate a variety of distances between the location of a power supply 138 and the location where a user positions the body 105 of the lid 100.

As shown in the embodiment provided in FIG. 5, in some instances the lid 100 may further comprise a power supply 138 electrically connected to the motor 131. In such embodiments, the power supply 138 may comprise a battery housed within the body of the motor 131, as further shown in FIG. 5. It is understood the body of the motor 131 and the power supply 138 shown in FIG. 5 are not to scale and are illustrated in the manner provided only to provide a general representation as to how a power supply may be disposed within the body of the motor 131 in some embodiments of the lid 100. As such, the power supply 138 shown in FIG. 5 may be any power supply suitable for powering the motor 131 disclosed herein. For instance, to reduce the lid's 100 impact on the environment, the power supply 138 may comprise a rechargeable battery, such as a lithium-ion battery. Accordingly, the dimensions of the power supply 138 and/or body of the motor 131 may vary from that shown in FIG. 5 depending on the type of power supply used. In some instances, the lid may further comprise one or more solar panels 135 electrically connected to the power supply 138 and configured to charge the same, as further shown in FIG. 5. In such embodiments, the one or more solar panels 135 may be secured to the top face 112A of the container engagement portion 110. In some embodiments, the motor 131 may have an ON/OFF switch which users may engage to open or close the electrical pathway extending between the motor 131 and the power supply 138.

In a preferred embodiment, the fan 130 is secured to the body 105 of the lid 100 by inserting the motor 131 partially through the docking port 116 and subsequently securing the fan blade 136 to the motor 131. In one such embodiment, the motor 131 may have a body having an upper portion 131A having a diameter greater than the diameter of the docking port 116 and a lower portion 131B having a diameter smaller than the diameter of the docking port 116, as best shown in FIGS. 1 and 8. In such embodiments, the lower portion 131B of the motor's 131 body may be inserted into the docking port 116 such that the upper portion 131A of the motor's 131 body rests on top face 112A of the container engagement portion 110 and the axle 134 extends downwardly into the first air channel 140. The fan blade 136 may then be connected to the axle 134 such that the motor 131 cannot be disassociated from the container engagement portion 110 without disconnecting the fan blade 136 from the axle 134. Alternatively, the entirety of the motor's 131 body may have a diameter smaller than the diameter of the docking port 116. In such embodiments, to prevent the motor 131 from passing entirely through the docking port 116, the body of the motor 131 may have a gasket or other device or instrument secured between the motor's 131 first and second end which, in conjunction with the body of the motor 131, establishes a diameter greater than the diameter of the docking port 116.

As shown in FIG. 8, the fan 130 is preferably secured to the body 105 such that the fan blade 136 is disposed below the at least one intake opening 119 and rotation of the fan blade 136 either draws air in or pushes air out of the at least one intake opening 119, depending on the direction of fan blade 136 rotation. When the fan 130 is secured to the body 105, the fan blade 136 may be disposed within the first air channel 140, as further shown in FIG. 8. Alternatively, the fan blade 136 may be positioned below the second end of the duct portion 120. The extent to which the fan blade 136 is disposed within or outside of the first air channel 140 may be adjusted by increasing the length of the axle 134 or through the use of one or more spacers (not shown) configured to indirectly interconnect the fan blade 136 to the axle 134. As shown in FIGS. 1 and 8-9, when the fan 130 is secured to the body 105, the electrical connector 132 or the electrical cable 133 electrically connecting the electrical connector 132 to the motor 131 is positioned above the upper face 112A of the container engagement portion 110.

Power drawn from the power supply 138 by the electrical connector 132 is used by the motor 131 to rotate the axle 134 in a defined direction of rotation. As best shown in FIG. 2, in a preferred embodiment, the fan blade 136 is mechanically connected to the axle 134 of the motor 131 such that rotation of the axle 134 rotates the fan blade 136. Preferably, the motor 131 is configured to rotate the axle 134 in a first direction of rotation, e.g., counterclockwise, such that the fan blade 136 draws ambient air 300A downwardly through the at least one intake opening 119 and pushes the same through the first air channel 140. Upon exiting the first air channel 140, the ambient air 300A may pass over or through the contents 250 of the beverage container 200, as shown best in FIG. 8.

As the ambient air 300A passes over or through the contents 250 of the beverage container 200, heat is exchanged between the contents of the ambient air and the contents of the beverage container 200, thereby conditioning the ambient air. For instance, if the temperature of the ambient air 300A is greater than the temperature of the contents 250 of the beverage container 200, heat from the ambient air 300A is transferred to the contents 250 of the beverage container 200, thereby cooling the ambient air 300A to produce cooled, conditioned air 300B deliverable to users. Conversely, if the temperature of the ambient air 300A is less than the temperature of the contents 250 of the beverage container 200, heat from the contents 250 of the beverage container 200 is transferred to the ambient air 300A, thereby warming the same to produce warmed, conditioned air 300B deliverable to users. Accordingly, users may adjust the temperature of conditioned air 300B outputted by the lid 100 by altering the temperature or type of contents 250 present within the beverage container 200. The contents 250 of the beverage container 200 may be of a solid state, such as natural or artificial ice, as shown in FIG. 8 or of a liquid state, such as hot or cold beverage. In instances where the contents 250 of the beverage container 200 are such that ambient air 300A can only pass over and not through the contents 250, it is preferred that the beverage container 250 be filled such that the second end of the duct portion 120 is not completely covered by or submerged within the contents 250 of the beverage container 250.

In an alternative embodiment, the motor 131 may be configured to rotate the axle 134 in a second direction of rotation that is opposite the first direction of rotation such that the fan blade 136 draws air within the internal volume of the beverage container 200 upwardly through the first air channel 140 and pushes the same out of the at least one intake opening 119 into the external environment surrounding the lid 100 and beverage container 200. In some embodiments, the motor 131 may have a switch that enables users to select whether the motor 131 rotates the axle 134 in the first or second direction of rotation.

The container engagement portion 110 has a second air channel 150 therein for receiving air exiting the air channel 140 and directing the same out of the lid 100 and beverage container 200 for delivery to users, as shown in FIG. 8. As shown in FIGS. 4 and 8, the second air channel 150 extends from the lower section 114 to the upper section 112 of the container engagement portion 110. As further shown in FIGS. 4 and 8, the second air channel 150 has an inlet 150A in which conditioned air 300B first enters the second air channel 150 and outlet 150B out of which the conditioned air 300B exits into the environment surrounding the lid 100 and beverage container 200. The inlet 150A of the second air channel 150 may be defined by an interior surface of the container engagement portion 110 and the exterior surface of the duct portion 120, as shown in FIGS. 4 and 8. Alternatively, the inlet 150A may be defined by the container engagement portion 110 alone. As further shown in FIGS. 4 and 8, the inlet 150A preferably encompasses the first air channel 140. In such embodiments, the bottom of the lower section 114 of the container engagement portion may be substantially hollow. One of skill in the art will readily appreciate, however, that the shape of the inlet 150A, size of the inlet 150A, and extent to which the inlet 150A surrounds the first air channel 140 may vary and still fall within the scope of the present disclosure. As shown best in FIG. 5, the outlet 150B of the second air channel 150 may be disposed within the side wall 112B of the upper section 112 of the container engagement portion 110. Alternatively, the outlet 150B may be disposed within the top face 112A of the upper section 112 of the container engagement portion 110. As shown in FIGS. 1-4 and 8-9, the container engagement portion 110 may have a spout 117 extending outwardly from the outlet 150B of the second air channel 150 to further direct conditioned air 300B exiting the lid 100. In some embodiments like as shown in FIG. 5, the container engagement portion 110 may be devoid of such a spout.

To use the lid 100, the body 105 is first engaged with the open end 205 of a beverage container 200 containing cool or heated substances therein such that the container engagement portion 110 of the body 105 covers the open end 205 of the beverage container 200 and the duct portion 120 is suspended within the interior volume of the beverage container. In one embodiment, the body 105 is engaged with the open end 205 of the beverage container 200 by interlocking threading 115 on the lower section 114 of the container engagement portion 110 with the threading 210 of the beverage container 200. In an alternative embodiment, the body 105 may be engaged with the open end 205 of the beverage container 200 by inserting the lower section 114 into the open end of the 205 of the beverage container 200 until the upper section 112 of the container engagement portion 110 rests on top of the rim 215 of the beverage container 200. Electrical power from a power supply 138 is applied to the motor 131 by electrically connecting the electrical connector 132 of the motor 131 to the power supply 138, thereby causing the fan blade 136 to rotate and draw ambient air 300A through the intake opening 119 of the container engagement portion 110 and into the first air channel 140. The first air channel 140 directs the ambient air 300A over or through the contents 250 of the beverage container 200 to generate conditioned air 300B. The wall of the beverage container and incoming ambient airflow caused by rotation of the fan blade 136 directs conditioned air 300B through the second air channel 150 for delivery to a user.

It is understood that versions of the inventive subject matter of the present disclosure may come in different forms and embodiments. Additionally, it is understood that one of skill in the art would appreciate these various forms and embodiments as falling within the scope of the inventive subject matter disclosed herein.

What is claimed is:
1. A lid for use with a beverage container, the lid comprising: a body defined by a container engagement portion configured to cover an open end of the beverage container and a duct portion extending downwardly from the container engagement portion, the duct portion defining a first air channel and the container engagement portion having an intake opening disposed above the first air channel; and a fan configured to draw air through the intake opening into the first air channel, the fan comprising: a motor configured to electrically connect to a power supply; and a fan blade operably connected to the motor, wherein the fan is secured to the body such that the fan blade is disposed below the intake opening, wherein the container engagement portion has a second air channel for receiving air exiting the first air channel and outputting the air outside of the lid and the beverage container, wherein the container engagement portion has an upper section, wherein the upper section of the container engagement portion has a cavity centrally disposed therein, wherein a docking port and the intake opening extend through a floor of the cavity to the first air channel, wherein the motor has a first end configured to electrically connect to the power supply and a second end having the fan blade operably connected thereto, and wherein the motor extends through the docking port such that the first end is disposed above the floor of the cavity and the fan blade is disposed within the first air channel.

2. The lid of claim 1, wherein the second air channel has an inlet encompassing the first air channel.

3. The lid of claim 2, wherein the inlet is defined by an interior surface of the container engagement portion and an exterior surface of the duct portion.

4. The lid of claim 1, wherein the container engagement portion has the upper section having a first diameter and a lower section having a second diameter smaller than the first diameter.

5. The lid of claim 4, wherein the lower section of the container engagement portion has a substantially hollow bottom.

6. The lid of claim 4, wherein the lower section of the container engagement portion has a first set of threading configured to interlock with a second set of threading disposed on a surface of the beverage container.

7. The lid of claim 4, wherein the upper section of the container engagement portion has a cavity centrally disposed therein, and
wherein the intake opening extends through a floor of the cavity to the first air channel.

8. The lid of claim 4, wherein the second air channel has an outlet disposed within a side wall of the upper section of the container engagement portion.

9. The lid of claim 8, wherein the container engagement portion has a spout extending outwardly from the outlet of the second air channel.

10. The lid of claim 1, wherein the duct portion has a first diameter smaller than a second diameter defined by the container engagement portion.

11. The lid of claim 1, wherein the fan comprises a motor operably connected to a fan blade.

12. The lid of claim 11, wherein the motor is adapted to electrically connect to a computing device.

13. The lid of claim 1 further comprising a power supply electrically connected to the motor and a solar panel secured to the container engagement portion and electrically connected to the power supply,
wherein the solar panel is configured to charge the power supply.

14. A lid for use with a beverage container, the lid comprising:
a body defined by a container engagement portion configured to cover an open end of the beverage container and a duct portion extending downwardly from the container engagement portion,
the duct portion defining a first air channel and the container engagement portion having an intake opening disposed above the first air channel; and
a fan configured to draw air through the intake opening into the first air channel,
the fan comprising:
a motor configured to electrically connect to a power supply; and
a fan blade operably connected to the motor,
wherein the fan is secured to the body such that the fan blade is disposed below the intake opening,
wherein the container engagement portion has a second air channel for receiving air exiting the first air channel and outputting the air outside of the lid and the beverage container,
wherein the second air channel has an inlet encompassing the first air channel,
wherein the container engagement portion has an upper section having a first diameter and a lower section having a second diameter smaller than the first diameter,
wherein the lower section of the container engagement portion has a substantially hollow bottom and a first set of threading configured to interlock with a second set of threading disposed on an interior surface of the beverage container,
wherein the upper section of the container engagement portion has a cavity centrally disposed therein,
wherein a docking port and the intake opening extend through a floor of the cavity to the first air channel,
wherein the motor has a first end configured to electrically connect to the power supply and a second end having the fan blade operably connected thereto, and
wherein the motor extends through the docking port such that the first end is disposed above the floor of the cavity and the fan blade is disposed within the first air channel.

15. The lid of claim 14, wherein the inlet is defined by an interior surface of the container engagement portion and an exterior surface of the duct portion.

16. The lid of claim 14, wherein the second air channel has an outlet disposed within a sidewall of the upper section of the container engagement portion.

17. The lid of claim 14, wherein the duct portion has a first diameter smaller that a second diameter defined by the lower section of the container engagement portion.

18. A lid for use with a beverage container, the lid comprising:
a body defined by a container engagement portion configured to cover an open end of the beverage container and a duct portion extending downwardly from the container engagement portion,
the container engagement portion having an upper section having a first diameter and a lower section having a substantially hollow bottom, a second diameter smaller than the first diameter, and a first set of threading configured to interlock with a second set of threading disposed on an interior surface of the beverage container,
wherein the duct portion defines a first air channel and the container engagement portion has an intake opening and a docking port disposed above the first air channel; and
a fan configured to draw air through the intake opening into the first air channel,
the fan comprising:
a motor having a first end configured to electrically connect to a power supply and a second end operably connected to a fan blade,
wherein the motor extends through the docking port such that the first end is disposed above the upper section of the container engagement portion and the fan blade is disposed within the first air channel,
wherein the container engagement portion has a second air channel for receiving air exiting the first air channel and outputting the air outside the lid and the beverage container,
the second air channel having an inlet and an outlet,
wherein the inlet encompasses the first air channel and is defined by an interior surface of the container engagement portion and an exterior surface of the duct portion, and wherein the outlet is disposed within a side wall of the upper section of the container engagement portion.

* * * * *